(12) United States Patent
Watanabe et al.

(10) Patent No.: US 12,203,589 B2
(45) Date of Patent: Jan. 21, 2025

(54) DISPLAY MOUNTING DEVICE

(71) Applicant: SHARP KABUSHIKI KAISHA, Sakai (JP)

(72) Inventors: Hikaru Watanabe, Sakai (JP); Shinji Tabata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 189 days.

(21) Appl. No.: 17/963,922

(22) Filed: Oct. 11, 2022

(65) Prior Publication Data
US 2023/0120537 A1    Apr. 20, 2023

(30) Foreign Application Priority Data

Oct. 15, 2021   (JP) .................................. 2021-169576

(51) Int. Cl.
*F16M 11/04*     (2006.01)
*F16M 11/10*     (2006.01)

(52) U.S. Cl.
CPC ........... *F16M 11/046* (2013.01); *F16M 11/10* (2013.01)

(58) Field of Classification Search
CPC ............... F16M 11/046; F16M 11/10; F16M 2200/024; F16M 11/22; F16M 11/38; F16M 13/02
See application file for complete search history.

(56) References Cited

U.S. PATENT DOCUMENTS

| | | | | |
|---|---|---|---|---|
| 3,903,812 | A * | 9/1975 | Cowley | A47B 27/06 108/150 |
| 6,478,275 | B1 * | 11/2002 | Huang | G09F 3/00 248/278.1 |
| 2004/0035989 | A1 * | 2/2004 | Sweere | F16M 11/2064 248/127 |
| 2011/0278424 | A1 * | 11/2011 | Theis | F16M 11/24 248/608 |
| 2020/0174515 | A1 * | 6/2020 | So | F16M 11/08 |

FOREIGN PATENT DOCUMENTS

JP   2008-052133 A   3/2008

* cited by examiner

*Primary Examiner* — Abhishek M Rathod
*Assistant Examiner* — Keon Kim
(74) *Attorney, Agent, or Firm* — ScienBiziP, P.C.

(57) ABSTRACT

A display mounting device includes a supporting pillar and a supporting pillar fixture. A display is mounted on the supporting pillar. The supporting pillar fixture is installed on a floor surface and coupled with the supporting pillar. In an extending direction of the supporting pillar, the display is detachably attached to a first end of the supporting pillar, and the supporting pillar fixture is coupled with a second end of the supporting pillar opposite to the first end in a rotatable manner. The supporting pillar fixture includes a rotation support that supports the supporting pillar in a rotatable manner. The rotation support allows for rotation of the supporting pillar within a range of angles between a first state where the extending direction of the supporting pillar is parallel to the floor surface and a second state where the extending direction of the supporting pillar is perpendicular to the floor surface.

3 Claims, 19 Drawing Sheets

DISPLAY MOUNTING DEVICE

INCORPORATION BY REFERENCE

This application claims the priority based on Japanese Patent Application No. 2021-169576 filed on Oct. 15, 2021 under 35 U.S.C. 119, the entire contents of which are incorporated herein by reference.

BACKGROUND

The present disclosure relates to a display mounting device.

Various techniques for fixing displays to walls or other surfaces have been disclosed so far. For example, the prior art discloses a display wall-hanging device for mounting a thin display with a large weight on the wall. Such a display wall-hanging device includes a pair of base brackets that are fixed to the wall and a hook unit that is fixed to the rear side of the display. To mount the display on the wall according to the prior art technique, a pair of hook units is attached to the rear side of the display, and the display is placed on the floor surface or other surface with the rear side of the display facing up. The display is then mounted on the wall by hooking the hooks of the hook units attached to the display in hanging holes formed in the pair of base brackets fixed to the wall.

SUMMARY

A display mounting device according to the present disclosure includes a supporting pillar and a supporting pillar fixture. A display is mounted on the supporting pillar. The supporting pillar fixture is installed on a floor surface and coupled with the supporting pillar. In an extending direction of the supporting pillar, the display is detachably attached to a first end of the supporting pillar, and the supporting pillar fixture is coupled with a second end of the supporting pillar opposite to the first end in a rotatable manner. The supporting pillar fixture includes a rotation support that supports the supporting pillar in a rotatable manner. The rotation support; allows for rotation of the supporting pillar within a range of angles between a first state in which the extending direction of the supporting pillar is parallel to the floor surface and a second state in which the extending direction of the supporting pillar is perpendicular to the floor surface.

DETAILED DESCRIPTION

Figure 1:
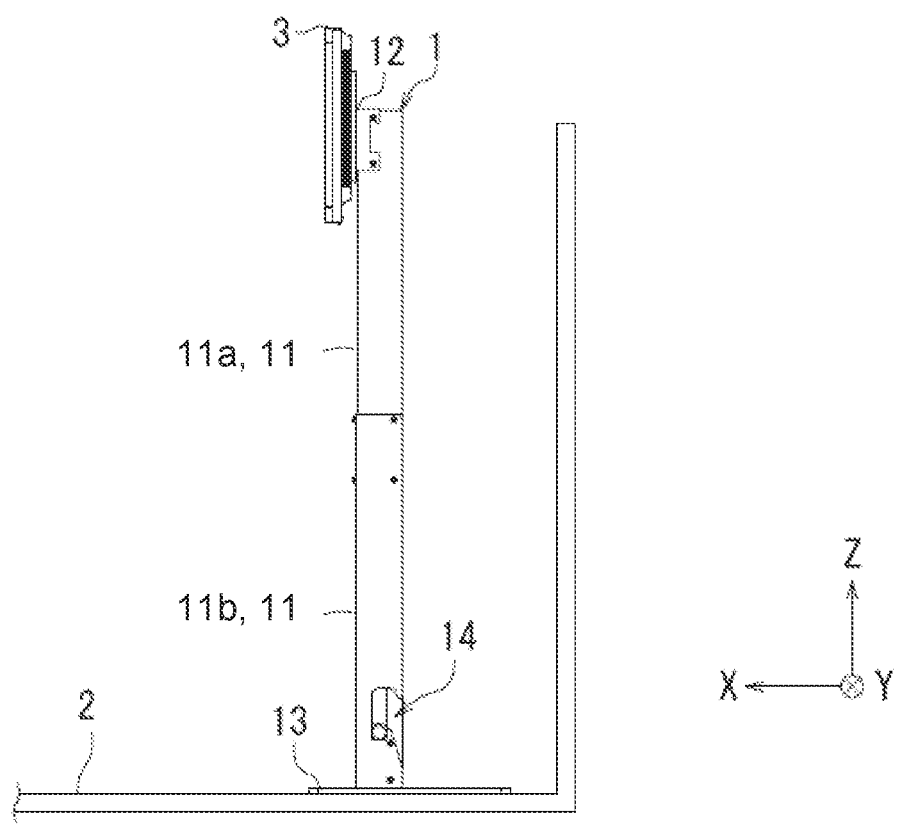
FIG. 1 is a side view of a display mounting device according to a first embodiment.

A display mounting device according to embodiments is described below with reference to the attached drawings. In the drawings, the same reference signs are given to the same or similar components, and the description of such components will not be repeated.

First Embodiment

Figure 2A:
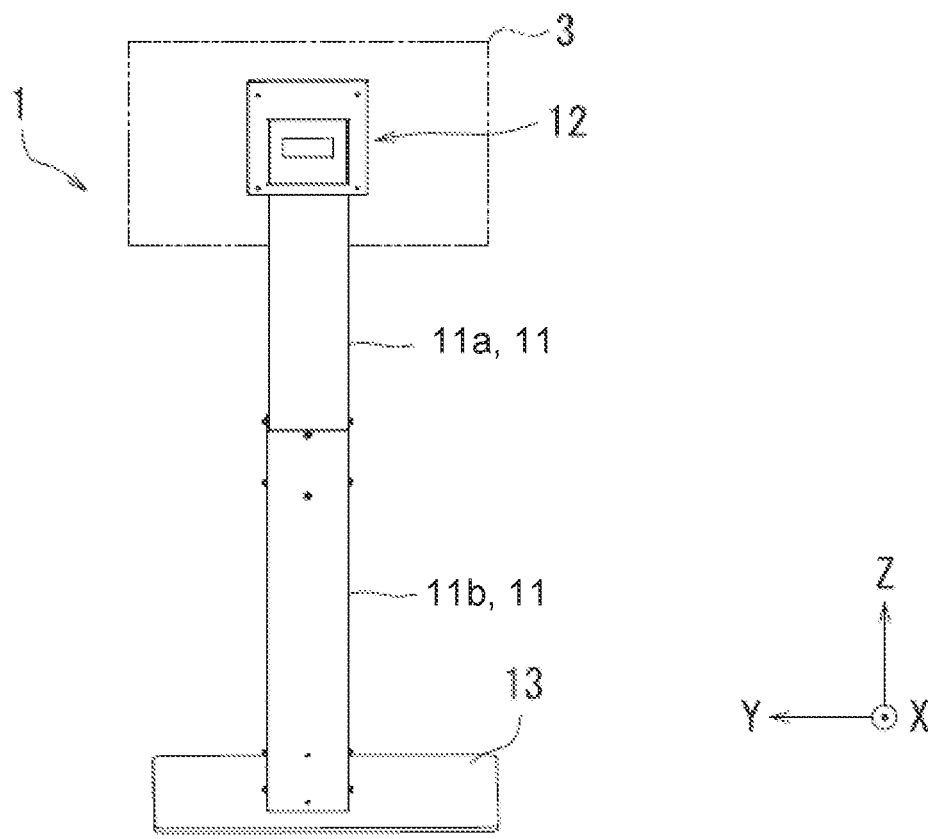
FIG. 2A is a front view of the display mounting device without a display mounted thereon.

FIG. 1 illustrates a side view of a display mounting device 1 according to a first embodiment. As illustrated in FIG. 1, the display mounting device 1 is installed on a floor surface 2, FIG. 2A is a front view of the display mounting device 1 without the display 3 mounted thereon. The display 3 can be detachably mounted on the display mounting device 1. The specific structure of the display mounting device 1 is described below.

As illustrated in FIGS. 1 and 2A, the display mounting device 1 includes a supporting pillar 11 (11a, 11b), a display fixture 12, a base 13, and a supporting pillar support 14 (example of a supporting pillar fixture).

The base 13 is, for example, a flat metal plate which is installed on a floor surface 2.

Figure 2B:
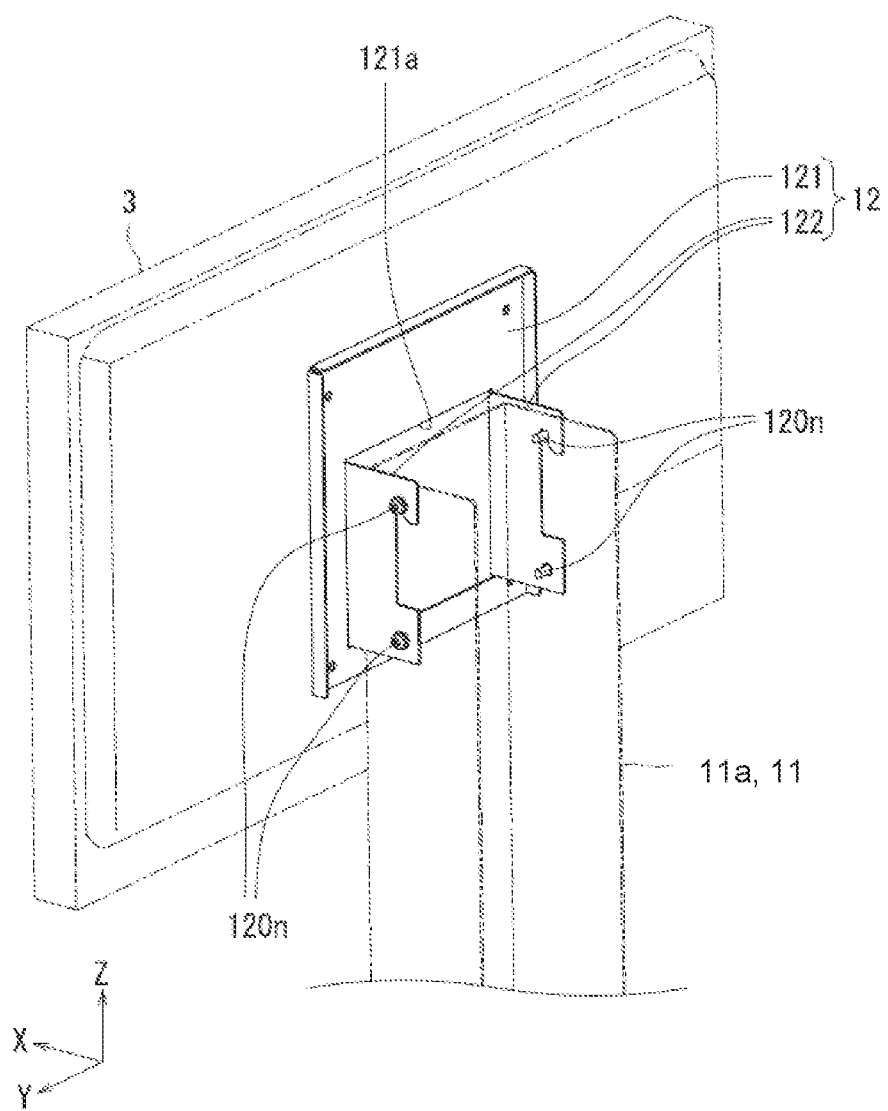
FIG. 2B is a perspective view of the rear side of the display mounting device illustrated in FIG. 2A, mainly illustrating a display fixture.

FIG. 2B is a perspective view of the rear side of the display mounting device 1 illustrated in FIG. 2A, mainly illustrating the display fixture 12. As illustrated in FIG. 2B, the display fixture 12 includes a display coupling 121 and a pair of supporting pillar couplings 122.

The display coupling 121 is made of a plate-shaped member having a rectangular-shaped opening 121a. The display coupling 121 is fixed to the rear side of the display 3 with screws or the like (not illustrated).

The pair of supporting pillar couplings 122 protrudes from the edge of the opening 121a of the display coupling 121 in a direction opposite to the display 3. Specifically, the supporting pillar couplings 122 are connected to a pair of sides of the opening 121a generally parallel to a direction (Z-axis direction) perpendicular to the floor surface 2 (FIG. 1). The pair of supporting pillar couplings 122 is fixed to the upper supporting pillar 11a with screws 120n.

Figure 3:
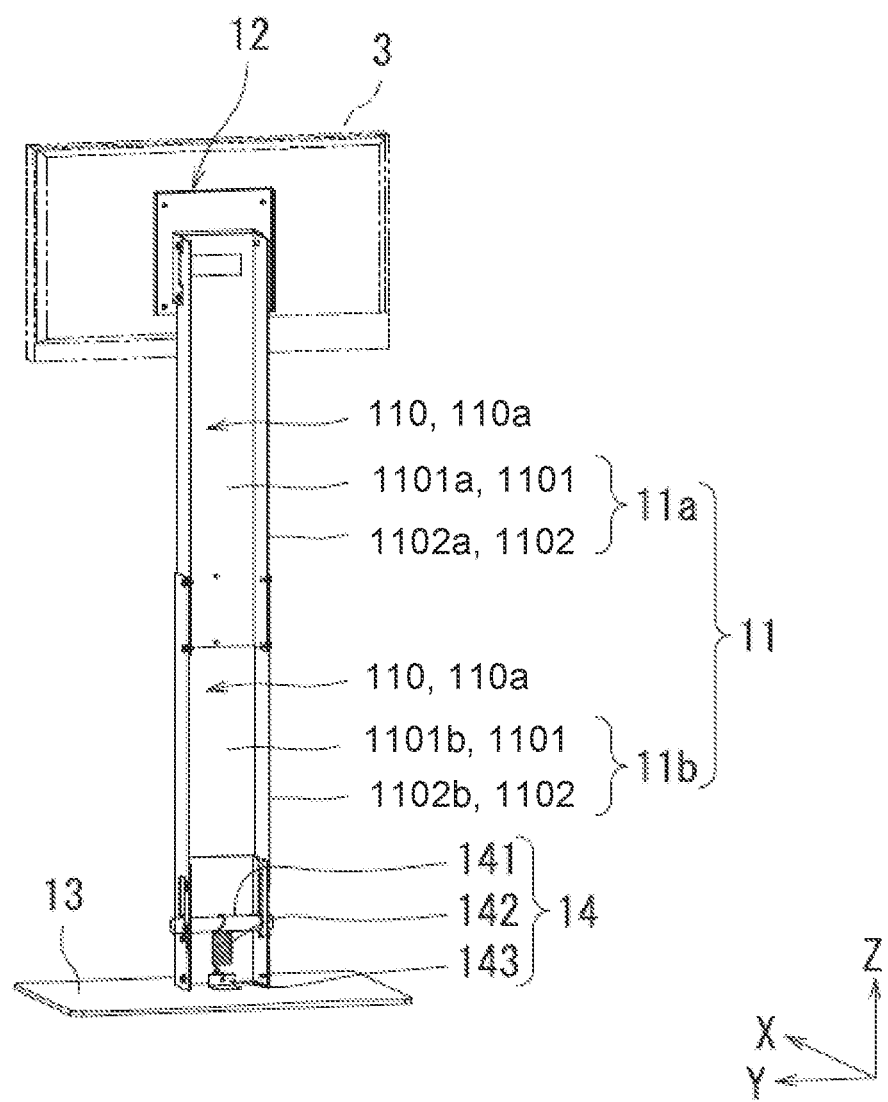
FIG. 3 is a rear view of the display mounting device.
Figure 4A:
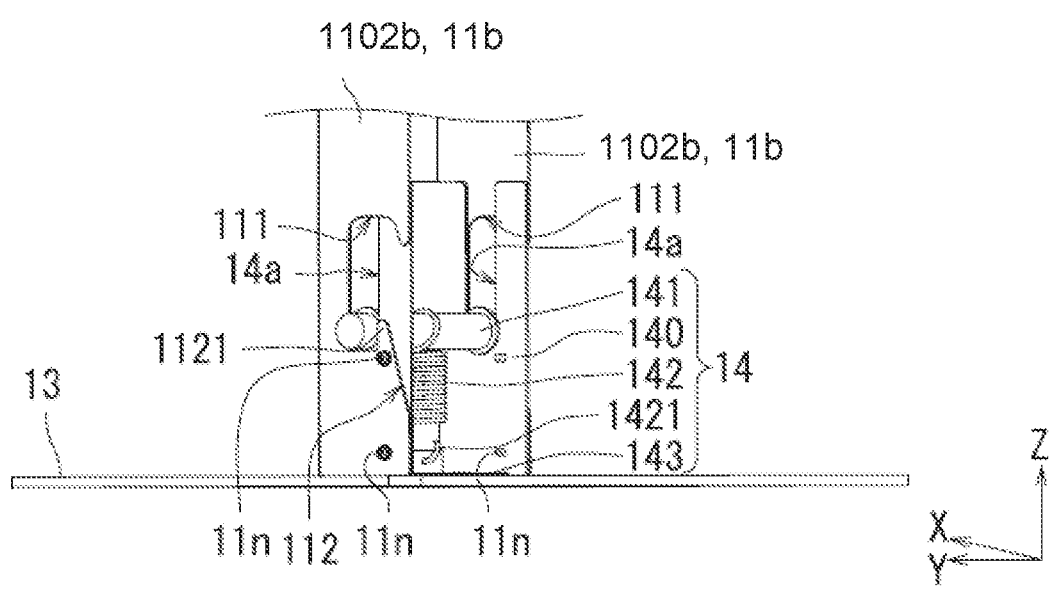
FIG. 4A is an enlarged view of a lower supporting pillar and a supporting pillar support illustrated in FIG. 3.
Figure 4B:
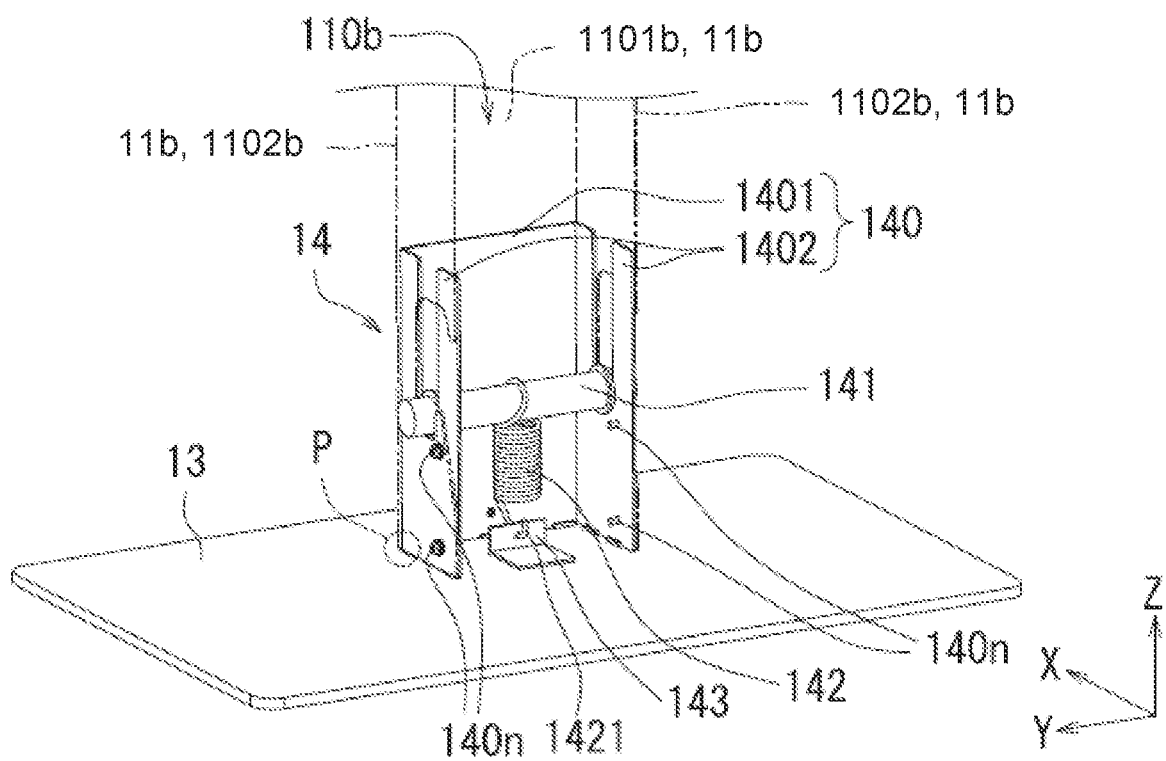
FIG. 4B is a perspective view of the rear side of the supporting pillar support illustrated in FIG. 4A.

FIG. 3 is a rear view of the display mounting device 1. FIG. 4A is an enlarged view of a lower supporting pillar 11b and the supporting pillar support 14. FIG. 4B is a perspective view mainly illustrating the rear side of the supporting pillar support 14.

As illustrated in FIG. 3, the supporting pillar 11 includes an upper supporting pillar 11a and the lower supporting pillar 1ib connected to each other. The supporting pillar 11 is rotatable within a range of angles between a first state in which the supporting pillar 11 is generally perpendicular to the floor surface 2 and a second state in which the supporting pillar 11 is generally parallel to the floor surface 2. The upper and lower supporting pillars 11a and 11b each include a plane 1101 (1101a, 1101b) and a pair of protrusions 1102 (11.02a, 1102b) connected to the plane 1101.

The plane 1101 is generally parallel to the display coupling 121, and the protrusions 1102 are generally parallel to the supporting pillar couplings 122. The plane 1101 (1101a, 1101b) and the protrusions 1102 (1102a, 1102b) constitute a recess 110 (110a, 110b) on the rear side (negative X-axis direction) of the supporting pillar 11. By routing cables (not illustrated) for the display 3 along an extending direction of the recess 110, the cables can be hidden on the rear side of the supporting pillar 11.

The pair of protrusions 1102a of the upper supporting pillar 11a is fixed to the pair of display couplings 121 with screws or the like (not illustrated) at a portion opposite to the lower supporting pillar 1ib.

The lower supporting pillar 1ib is mounted on the base 13. The pair of protrusions 1102b of the lower supporting pillar 1ib is fixed to the supporting pillar support 14 with screws 11n (FIG. 4A) at a portion opposite to the upper supporting pillar 11a.

In the present embodiment, a portion at which the display coupling 121 is connected to the upper supporting pillar 11a is an example of a first end of the supporting pillar 11, and a portion at which the supporting pillar support 14 is connected to the lower supporting pillar 11b is an example of a second end of the supporting pillar 11.

As illustrated in FIG. 4A, the protrusions 1102b of the lower supporting pillar 1ib each have a notch 111 and a guide 112. The notch 111 is a recess of each protrusion 1102b extending from an end opposite to the plane 1101b (see FIG. 3) toward the plane 1101b. The guide 112 is a portion of each protrusion 1102b at which a part of the end of the protrusion 1102b opposite to the plane 1101b is slanted toward the notch 111. The notch 111 and the guide 112 have a function of vertically moving a shaft 141 which will be described later. In the present embodiment, the shaft 141, the notch 111, and the guide 112 (example of a sliding mechanism) constitute an example of a locking mechanism.

As illustrated in FIGS. 4A and 4B, the supporting pillar support 14 is mounted on the base 13. The supporting pillar support 14 includes a coupling member 140, the shaft 141, a spring 142 (example of a rotation aid and elastic member), and a spring fixing member 143.

The coupling member 140 includes a plane 1401 and shaft supports 1402 connected to the plane 1401. The plane 1401 is generally parallel to the plane 1101b of the lower supporting pillar 11b, and the shaft supports 1402 are generally parallel to the protrusions 1102b of the lower supporting pillar 11b. The plane 1401 and the shaft supports 1402 overlap with the lower supporting pillar 1ib in the first state in which the supporting pillar 11 is generally perpendicular to the floor surface 2. An end point P of each of the shaft supports 1402 located on the floor surface 2 side overlapping with the lower supporting pillar 11b functions as a fulcrum to rotate the supporting pillar 11. In other words, in the present embodiment, the end point P is an example of a rotation support that allows the supporting pillar 11 to rotate between the first state in which the supporting pillar 11 is generally perpendicular to the floor surface 2 and the second state in which the supporting pillar 11 is generally parallel to the floor surface 2.

The shaft supports 1402 each have a groove 14a recessed from an end opposite to the base 13 toward the base 13. The shaft. 141 is crossed between the two grooves 14a. The shaft 141 is a rod-like member longer than the length between the grooves 14a. In the state illustrated in FIG. 4A in which the lower supporting pillar 1ib is fixed to the supporting pillar support 14, a width of the notch 111 from a tip 1121 on the notch 111 side of the guide 112 in the direction toward the plane 1101b (X-axis direction) is equal to the width of the groove 14a.

One end of the spring 142 is fixed at an approximately center of the shaft 141. The other end of spring 142 is provided with a hook 1421. The spring fixing member 143 is fixed to the base 13, and has a hole (not illustrated) in which the hook 1421 of the spring 142 is hooked. As illustrated in FIGS. 4A and 4ll, the spring 142 has a natural length in a state in which the shaft 141 is placed at the end portion of the grooves 14a on the base 13 side, that is, the first state in which the supporting pillar 11 is generally perpendicular to the floor surface 2. In other words, the shaft 141 is rested at an end position of the grooves 14a on the base 13 side in the first state to fix the supporting pillar 11 in place.

Figure 5:
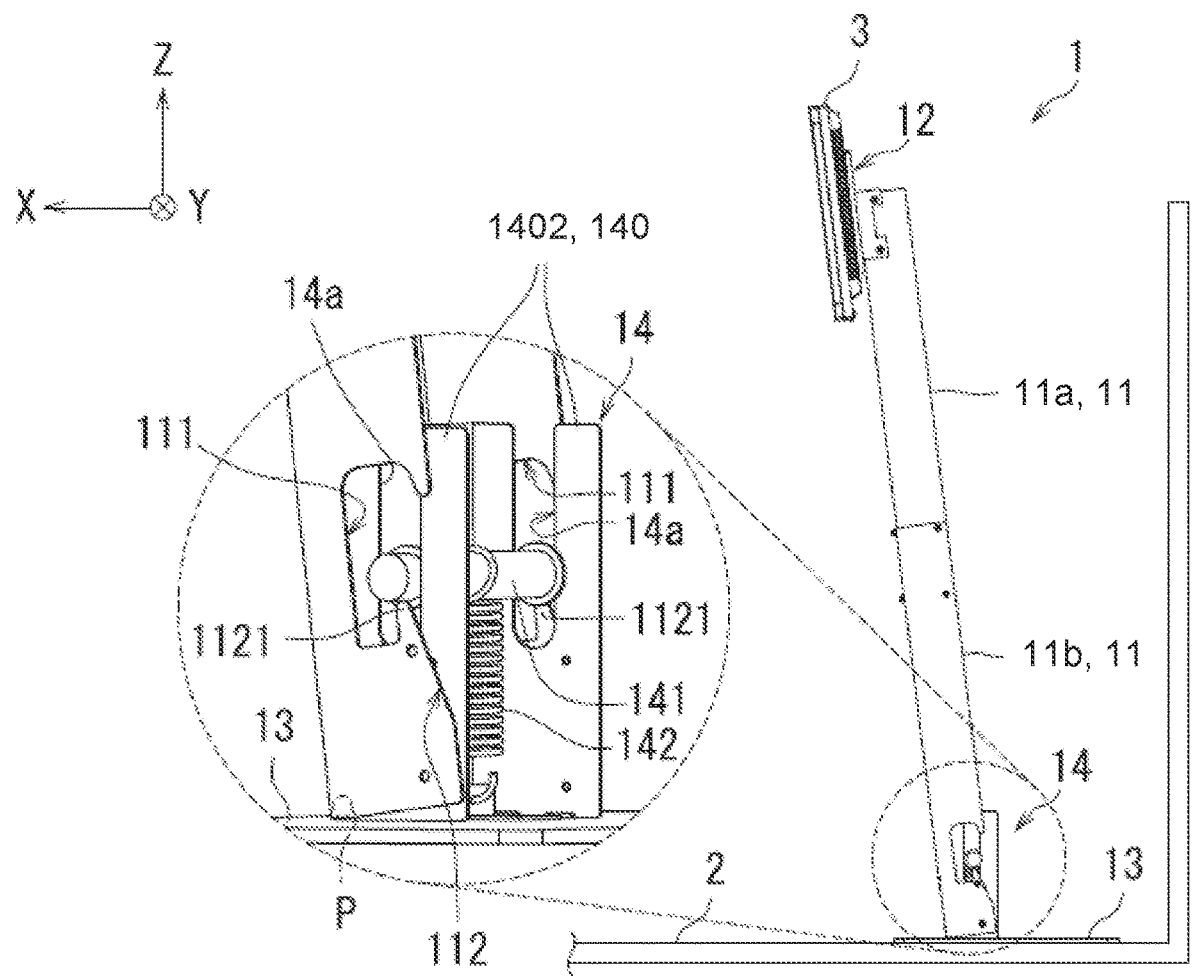
FIG. 5 illustrates a state in which the supporting pillar is rotated toward the floor surface from a first state illustrated in FIG. 1.
Figure 6:
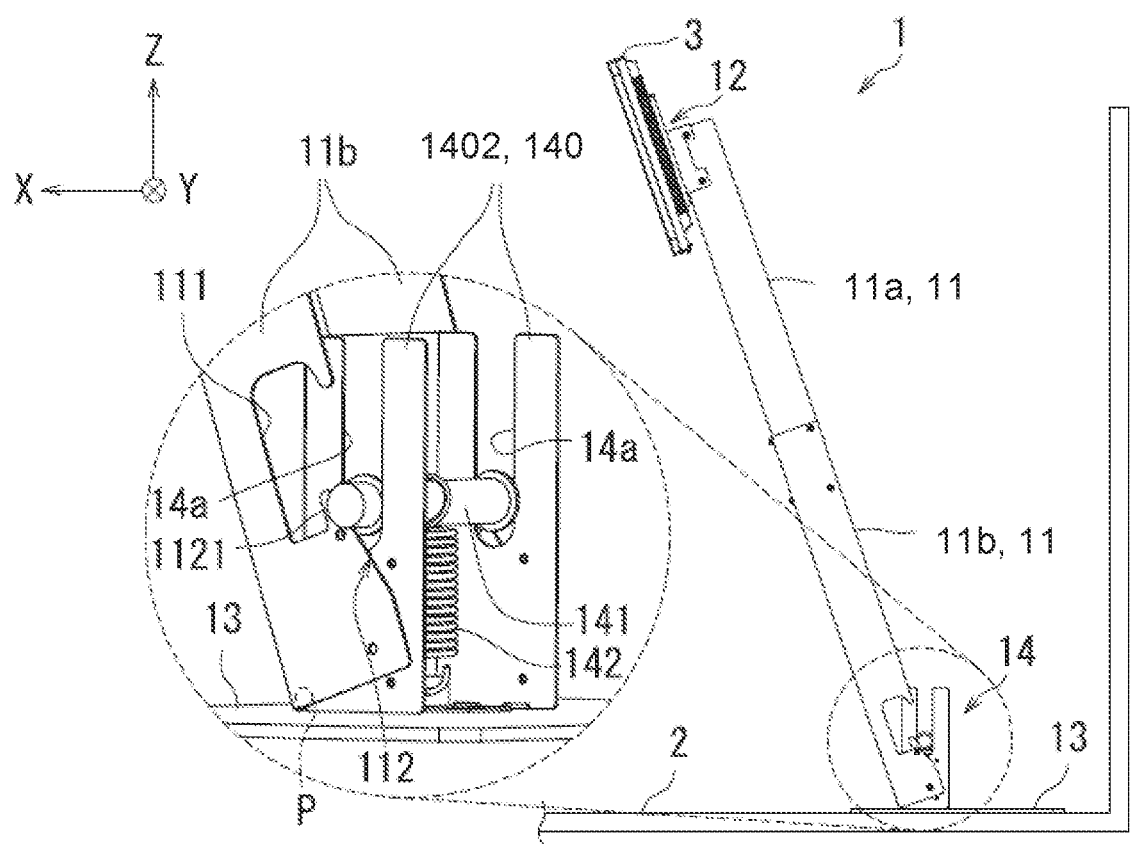
FIG. 6 illustrates a state in which the supporting pillar is farther rotated toward the floor surface from the state illustrated in FIG. 5.
Figure 7:
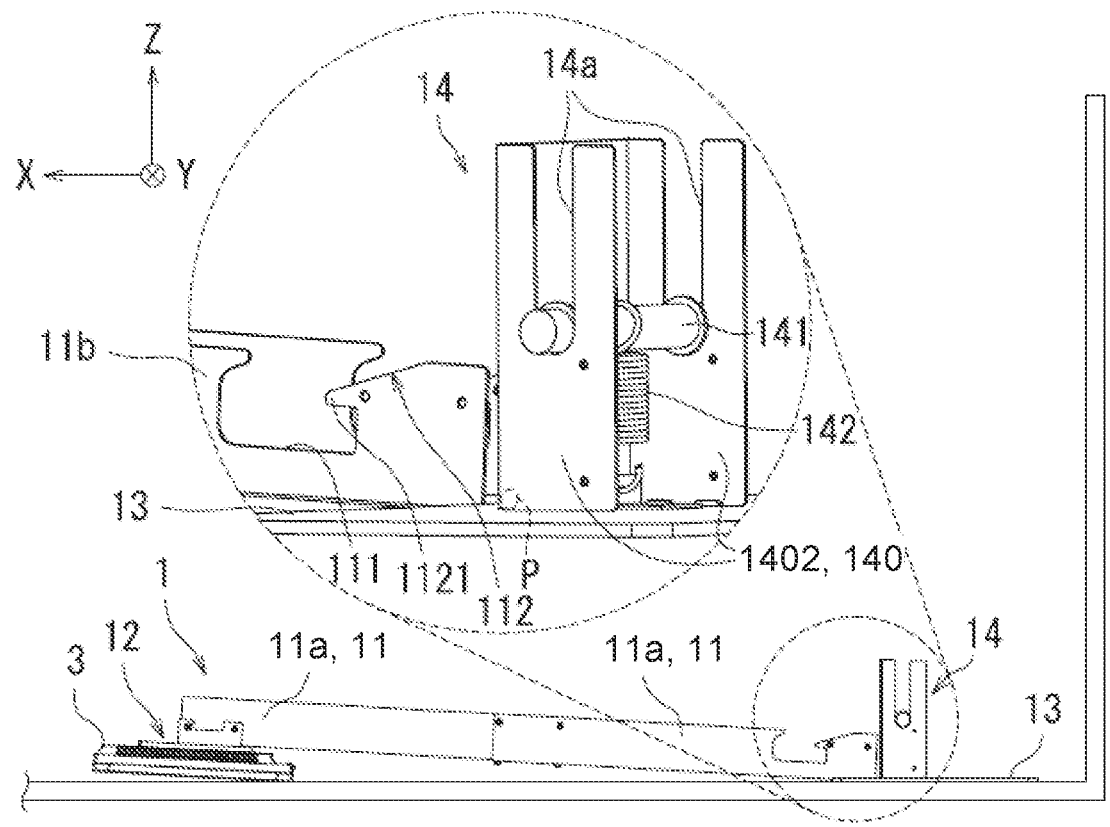
FIG. 7 illustrates the second state in which the supporting pillar is collapsed to the floor surface from the state illustrated in FIG. 6.

Next, the operation of removing the display 3 mounted on the display mounting device 1 is described by referring to FIGS. 5 to 7.

FIG. 5 illustrates a state in which the supporting pillar 11 is rotated toward the floor surface 2 from the first state illustrated in FIG. 1. To rotate the supporting pillar 11 toward the floor surface 2, the screws 11n (FIG. 4A) that connect the lower supporting pillar 11b to the supporting pillar support 14 are removed. Once the screws 11n are removed, the supporting pillar 11 can be rotated toward the floor surface 2 using the end point P (rotation support) of the base 13 side of the coupling member 140 as the fulcrum. As illustrated in FIG. 5, when the supporting pillar 11 is rotated toward the floor surface 2, the tip 1121 of the guide 112 of the lower supporting pillar 11b pushes up the shaft 141, and the spring 142 is extended. The extended spring 142 pulls the shaft 141 toward floor surface 2. Accordingly; a force in the direction of the base 13 is applied to the tip 1121 of the guide 112 which is in contact with the shaft 141, making it difficult for the supporting pillar 11 to fall vigorously toward the floor surface 2 side.

FIG. 6 illustrates a state in which the supporting pillar 11 is farther rotated toward the floor surface 2 from the state illustrated in FIG. 5. When the supporting pillar 11 is rotated farther toward the floor surface 2 from the state illustrated in FIG. 5, the position of the shaft 141 lowers along the guide 112 from the tip 1121 of the guide 112 of the lower supporting pillar 11b. Since the shaft 141 is in contact with the guide 112 of the lower supporting pillar 1ib, a force in the direction of the base 13 is applied to the guide 112 in the direction of the base 13, making it difficult for the supporting pillar 11 to fall vigorously to the floor surface 2 side.

FIG. 7 illustrates a second state in which the supporting pillar 11 is collapsed from the state illustrated in FIG. 6 to the floor surface 2. In the second state, the shaft 141 is placed at the end of the grooves 14a on the floor surface 2 side, and the spring 142 has a natural length. In this state, the display 3 can be removed from the display mounting device 1 by removing screws (not illustrated) connecting the display fixture 12 with the display 3.

To mount the display 3 on the display mounting device 1, it is simply necessary to reverse the procedure for removing the display 3 described above. Specifically, the display 3 is first placed on the floor surface 2 with the rear side of the display 3 facing up so that the display 3 is set in the second state in which the supporting pillar 11 is generally parallel to the floor surface 2. The rear side of the display 3 is then connected to the display coupling 121 with screws. Accordingly, the display mounting device 1 is in the state illustrated in FIG. 7.

In the state illustrated in FIG. 7, the supporting pillar 11 is rotated until the supporting pillar 11 is perpendicular to the floor surface 2 using the end point P of the coupling member 140 as the fulcrum. This allows the shaft 141 to be lifted along the guide 112, as illustrated in FIG. 6. In rotating the supporting pillar 11 farther until the supporting pillar 11 is perpendicular to the floor surface 2, the shaft 141 is pushed up by the tip 1121 of the guide 112, as illustrated in FIG. 5, and the position of the shaft 141 is moved along the notch 111, as illustrated in FIG. 4A, In other words, the shaft 141 is placed at the end of the grooves 14a on the floor surface 2 side. At this time, the shaft 141 is rested between the guide 112 and the notch 111 to fix the supporting pillar 11, thus making it difficult for the supporting pillar 11 to fall over even when the hand is off from the supporting pillar 11. In this state, the lower supporting pillar 11 and the coupling member 140 are fixed with the screws 11n to fully fix the supporting pillar 11 to the supporting pillar support 14.

In the present embodiment, the display mounting device 1 includes the shaft 141 and the spring 142 in the supporting pillar support 14, and the guide 112 in the lower supporting pillar 11b. Accordingly, in rotating the supporting pillar 11 toward the floor surface 2, the supporting pillar 11 is not likely to fall vigorously to the floor surface 2 side, achieving safe rotating movement of the supporting pillar 11.

In the present embodiment, the supporting pillar 11 can be collapsed to the floor surface 2 to mount the display 3, and the supporting pillar 11 can be rotated to stand up with the display 3 being mounted. This facilitates mounting the display 3, when it is relatively lightweight, by one person.

Second Embodiment

Figure 8:
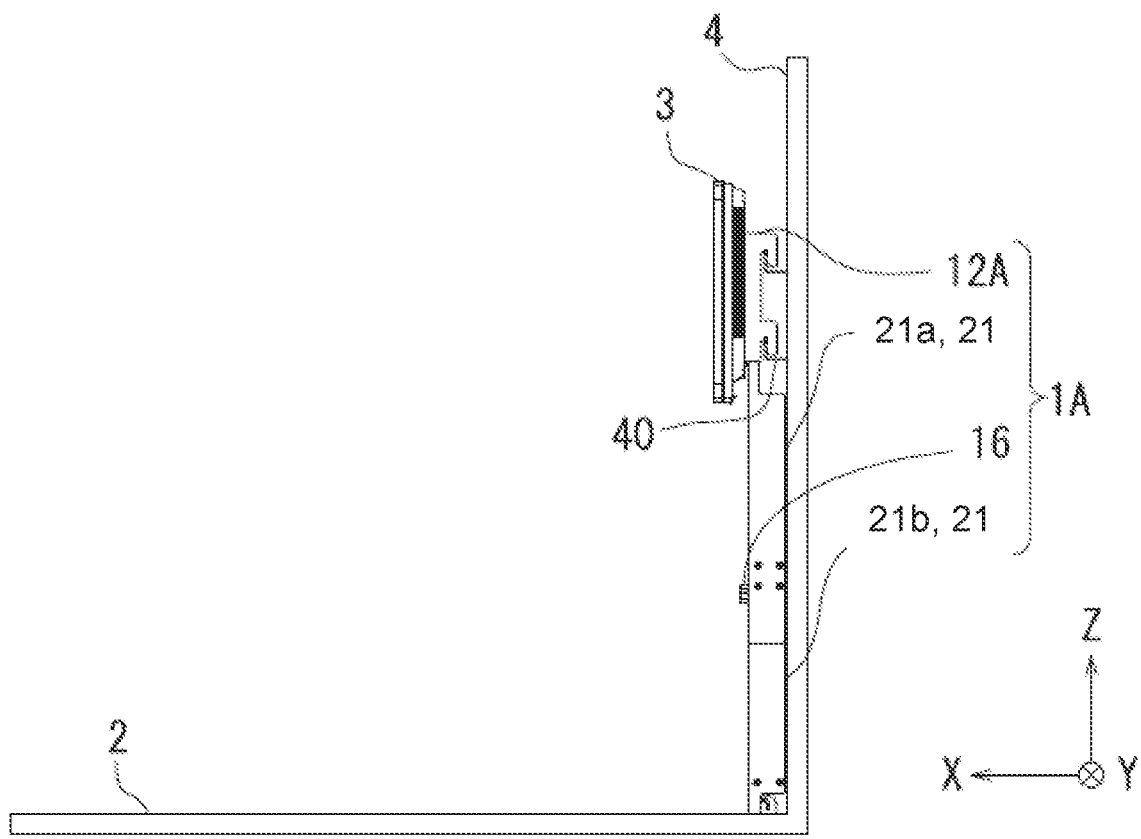
FIG. 8 is a side view of the display mounting device in the second embodiment.

FIG. 8 is a side view of a display mounting device 1A according to a second embodiment. In FIG. 8, the same reference signs are given to the same components as those illustrated in the first embodiment. In the following, the components different from those of the first embodiment will be mainly described.

In the present embodiment, as illustrated in FIG. 8, the display 3 is mounted on the wall 4 by hooking the display mounting device 1A to a wall-side bracket 40 installed on the wall 4. The display mounting device 1A includes a supporting pillar 21 (upper supporting pillar 21a, lower supporting pillar 21b), a display fixture 12A, a height adjustment screw 16, and a supporting pillar support 17 (example of a supporting pillar fixture).

Figure 9A:
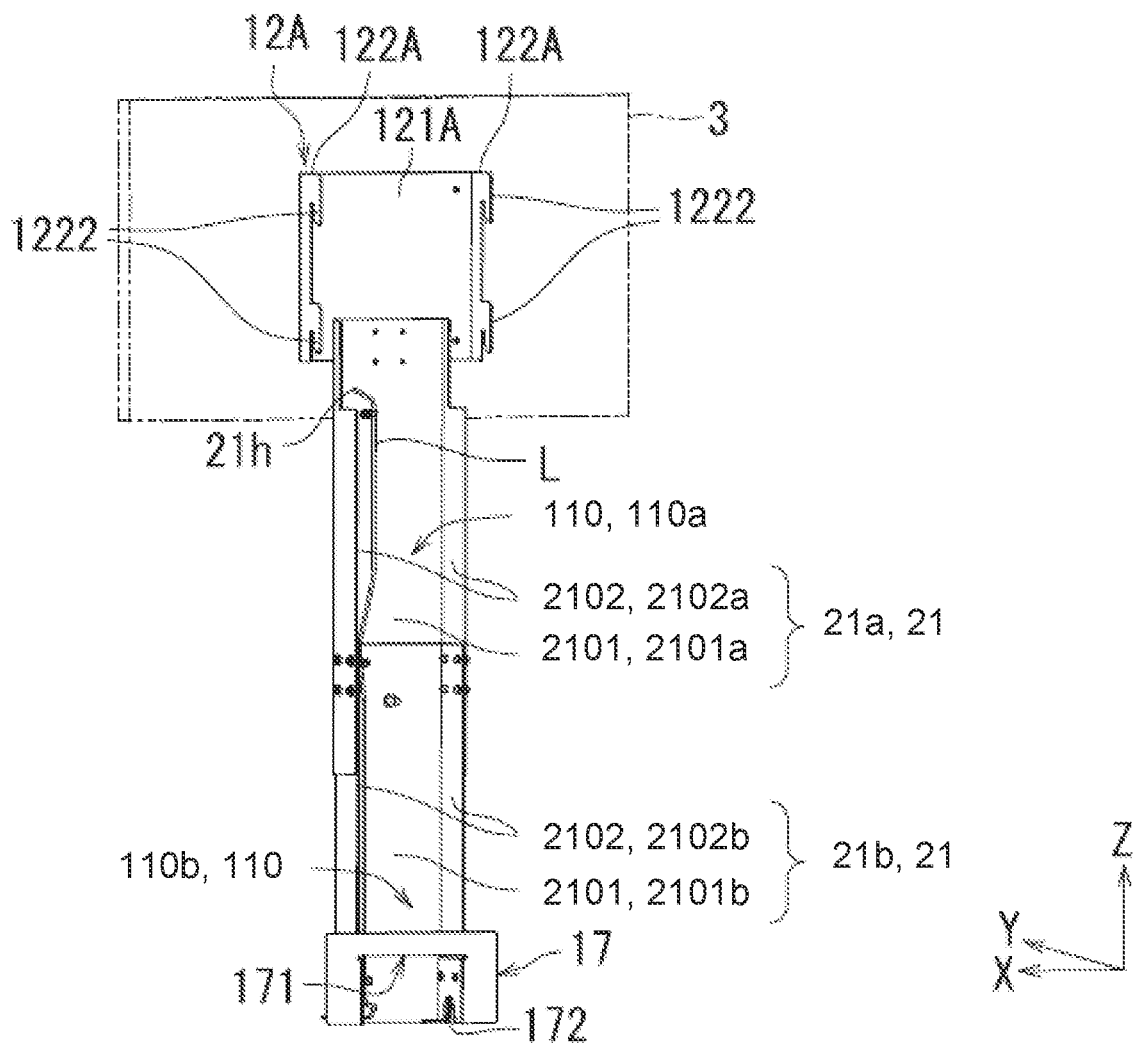
FIG. 9A is a rear view of the display mounting device illustrated in FIG. 8.

FIG. 9A is a rear view of the display mounting device 1A. The display fixture 12A includes a display coupling 121A and a pair of wall couplings 122A connected to the display coupling 121A.

The display coupling 121A is generally parallel to the rear side of the display 3 and has a rectangular shape. A part of the display coupling 121A located on the floor surface 2 side is connected to the upper supporting pillar 11a with screws (not illustrated).

The pair of wall couplings 122A is connected to a pair of sides of the display coupling 121A generally parallel to the a direction (Z-axis direction) perpendicular to the floor surface 2. The pair of wall couplings 122A each has two vertically spaced hooks 1222 formed across the display coupling 121A and protruding in a direction (negative Y-axis direction) opposite to the display 3. The hooks 1222 are hooked on the wall-side bracket 40 FIG. 8).

An upper supporting pillar 21A (example of the first supporting pillar) and a lower supporting pillar 21B (example of a second supporting pillar) each include a plane 2101 (2101a, 2101b) and a pair of protrusions 2102 (2102a, 2102b) connected to the plane 2101. The plane 2101 is generally parallel to the display coupling 121A, and the protrusions 2102 are generally parallel to the wall couplings 122A. The plane 2101 (2101a, 2101b) and the protrusions 2102 (21.02a, 21.02b) constitute a recess 110 (110a, 110b). The plane 2101a of the upper supporting pillar 21a has a hole 21h through which a cable L of the display 3 is routed. By routing the cable L through the hole 21h, the cable L can be hidden in the recess 110 of the supporting pillar 21.

Figure 9B:
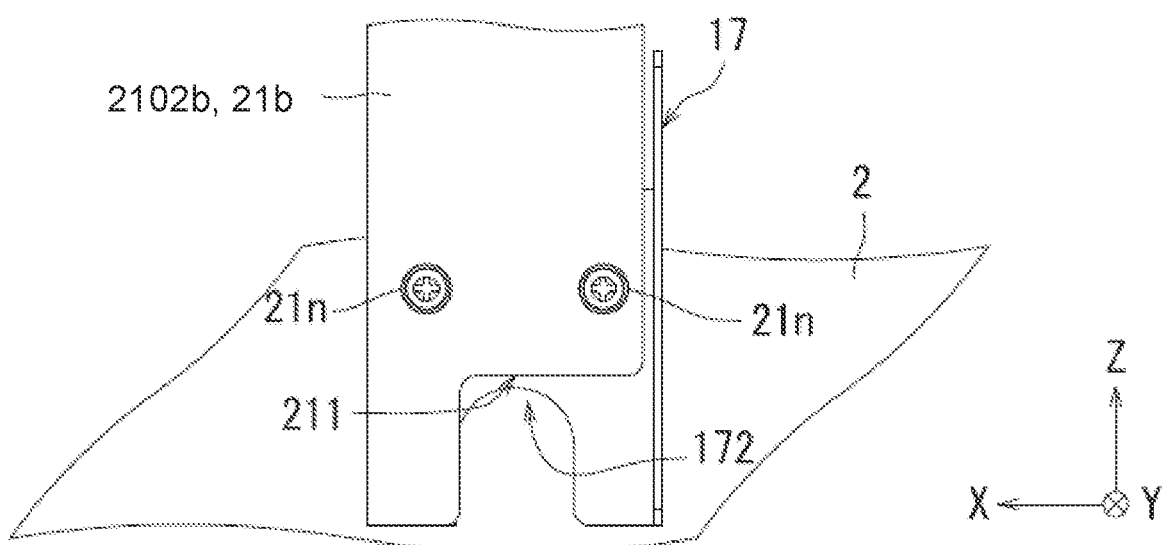
FIG. 9B is an enlarged view of the lower supporting pillar and the supporting pillar support of the display mounting device illustrated in FIG. 8.

FIG. 9B is an enlarged view of the lower supporting pillar 21b and the supporting pillar support 17 of the display mounting device 1A. As illustrated in FIG. 9B, the protrusions 2102b of the lower supporting pillar 21b are fixed to the supporting pillar support 17 with screws 21n. The protrusions 2102b each have a notch 211 at the end of the floor surface 2 side. The notch 211 is a recess at the end of the protrusion 2102b on the floor surface 2 side. In the first state in which the supporting pillar 21 is generally perpendicular to the floor surface 2, the notch 211 overlaps with a notch 172 of the supporting pillar support 17, which will be described later, to form a space between the notches 211, 172 and the floor surface 2 to route the cable L. In other words, the cable L passes through the recess 110 in the supporting pillar 21 and extend through the notches 211, 172 to be pulled out of the supporting pillar 21. In the present embodiment, the recess 110 of the supporting pillar 21 is an example of a wiring compartment, and the notch 172 is an example of an opening that communicates with the wiring compartment.

Figure 10:
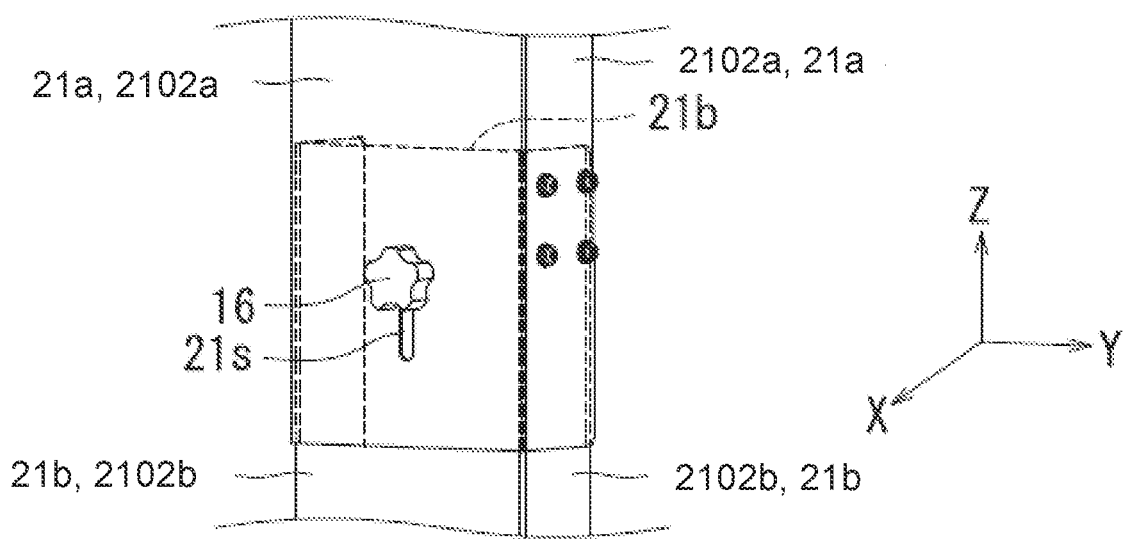
FIG. 10 is an enlarged view of a coupling between the upper supporting pillar and the lower supporting pillar illustrated in FIG. 8.

FIG. 10 is an enlarged view of the connected portion of the upper and lower supporting pillars 21a, 21b. As illustrated in FIG. 10, the upper and lower supporting pillars 21a, 21b are connected so that a portion of the upper supporting pillar 21a overlaps with a portion of the lower supporting pillar 21b. Specifically, a portion of the upper supporting pillar 21a is placed over a portion of the lower supporting pillar 21b. The plane 2101a of the upper supporting pillar 21a has a slide hole 21s at a portion on the lower supporting pillar 21b side.

A height adjustment screw 16 is fitted into the slide hole 21S. The size of the screw head of the height adjustment screw 16 is larger than a horizontal width (width in the Y-axis direction) of the slide hole 21s.

The height (length) of the entire supporting pillar 21 is adjusted by changing the position of the height adjustment screw 16 and the slide hole 21s. Specifically, to adjust the height of the supporting pillar 21, the height adjustment screw 16 is loosen to shift the position of the slide hole 21s and is then tighten, thus changing the length of the overlap between the upper and lower supporting pillars 21a and 21b and adjusting the height of the entire supporting pillar 21. In other words, the height adjustment screw 16 and slide hole 21s in the upper supporting pillar 21a constitute an example of a height adjustment mechanism.

Figure 11:
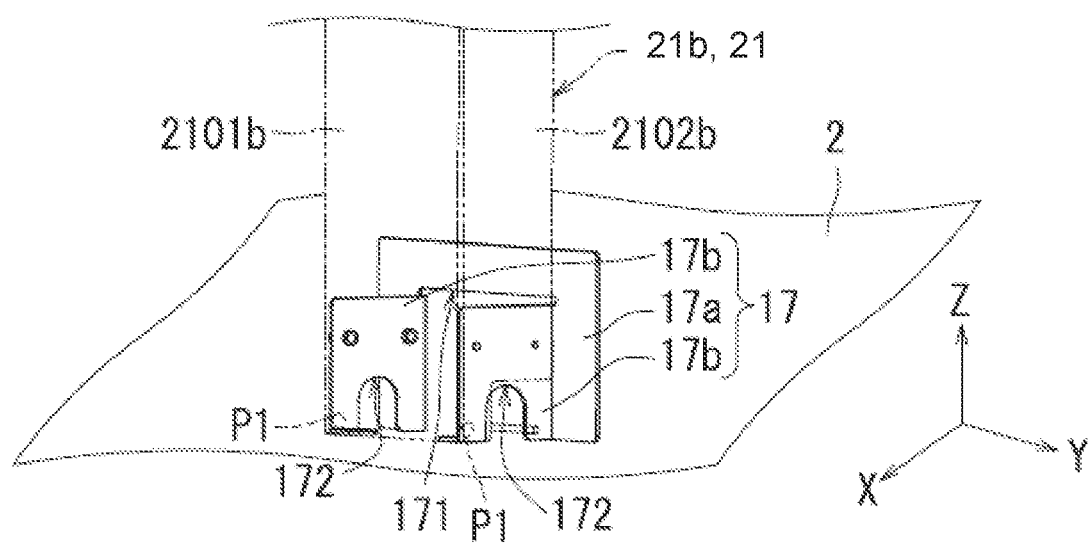
FIG. 11 is an enlarged perspective view of the supporting pillar support of the display mounting device illustrated in FIG. 9B.

FIG. 11 is an enlarged perspective view of the portion of the supporting pillar support 17 illustrated in FIG. 9. As illustrated in FIG. 11, the supporting pillar support 17 includes a wall contact portion 17a and a pair of supporting pillar fixing portions 17b connected to the wall contact portion 17a. In the supporting pillar support 17, the wall contact portion 17a and the supporting pillar fixing portions 17b may be integrally molded or may be formed separately and connected.

The wall contact portion 17a is generally perpendicular to the floor surface 2 and is in contact with the wall 4. The wall contact portion 17a has a recess 171 which is partially open on the floor surface 2 side.

The pair of supporting pillar fixing portions 17b is connected generally perpendicularly to the wall contact portion 17a at the edge of the recess 171 of the wall contact portion 17a. More specifically, the pair of supporting pillar fixing portions 17b is connected to a pair of sides of the recess 171, the pair of sides being generally parallel to the direction (Z-axis direction) perpendicular to the floor surface 2. The pair of supporting pillar fixing portions 17b is fixed to the pair of protrusions 2102b of the lower supporting pillar 21b with the screws 21n (FIG. 9B). The supporting pillar fixing portions 17b each have the notch 172. The notch 172 is an arched recess at the end of the supporting pillar fixing portion 17b on the floor surface 2 side.

The supporting pillar 21 can be rotated by removing the screws 21n (FIG. 9B) that fix the pair of supporting pillar supports 17 to the pair of protrusions 2102b, In other words, the supporting pillar 21 is rotated about an end point P1 (example of the rotation support) of each supporting pillar fixing portion 17h on the floor surface 2 side as the fulcrum.

Next, the operation of removing the display 3 mounted on the display mounting device 1A is described.

Figure 12:
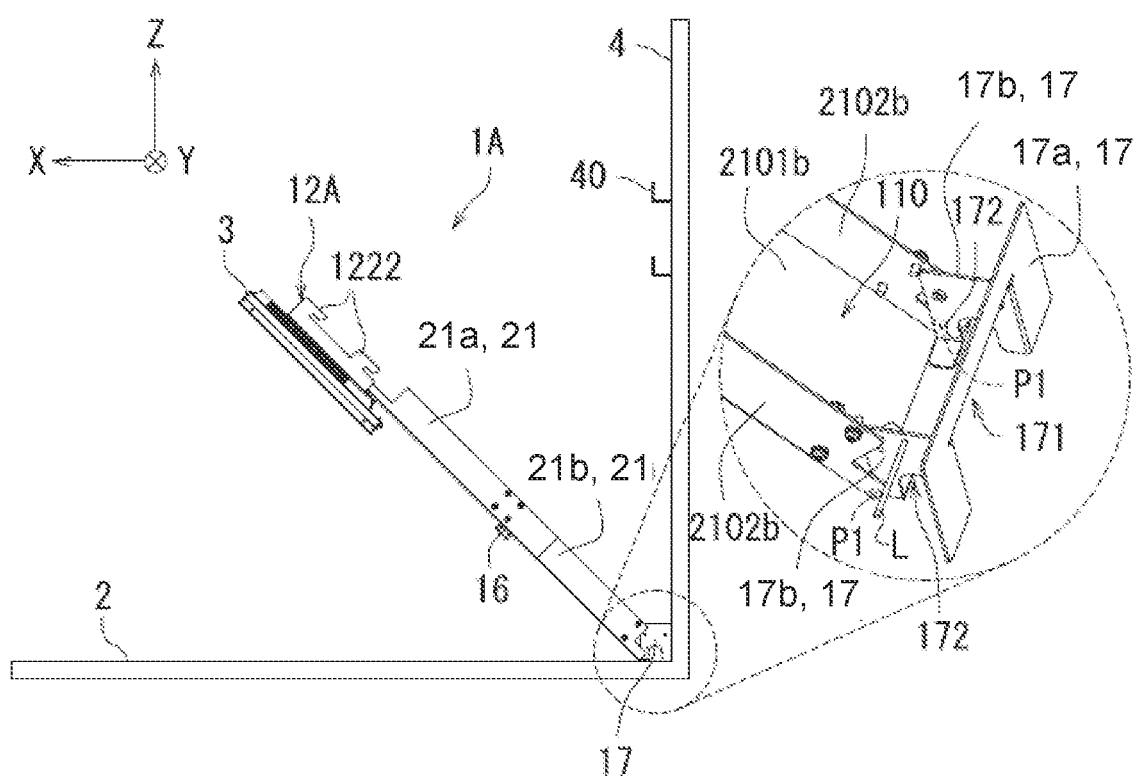
FIG. 12 illustrates a state in which the supporting pillar is rotated toward the floor surface from the state illustrated in FIG. 8.

In the state illustrated in FIG. 8, the screws 21n (FIG. 9B) fixing the pair of supporting pillar supports 17 to the pair of protrusions 2102b are removed. Subsequently, using the end point P1 (FIG. 11) of each supporting pillar fixing portion 17b as the fulcrum, the supporting pillar 21 is rotated toward the floor surface 2. FIG. 12 illustrates a state in which the supporting pillar 21 is rotated toward the floor surface 2 from the state illustrated in FIG. 8. The rotation of the supporting pillar 21 causes the hooks 1222 of the display mounting device 1A to be disengaged from the wall-side bracket 40, thus tilting the supporting pillar 21 toward the floor surface 2.

Figure 13:
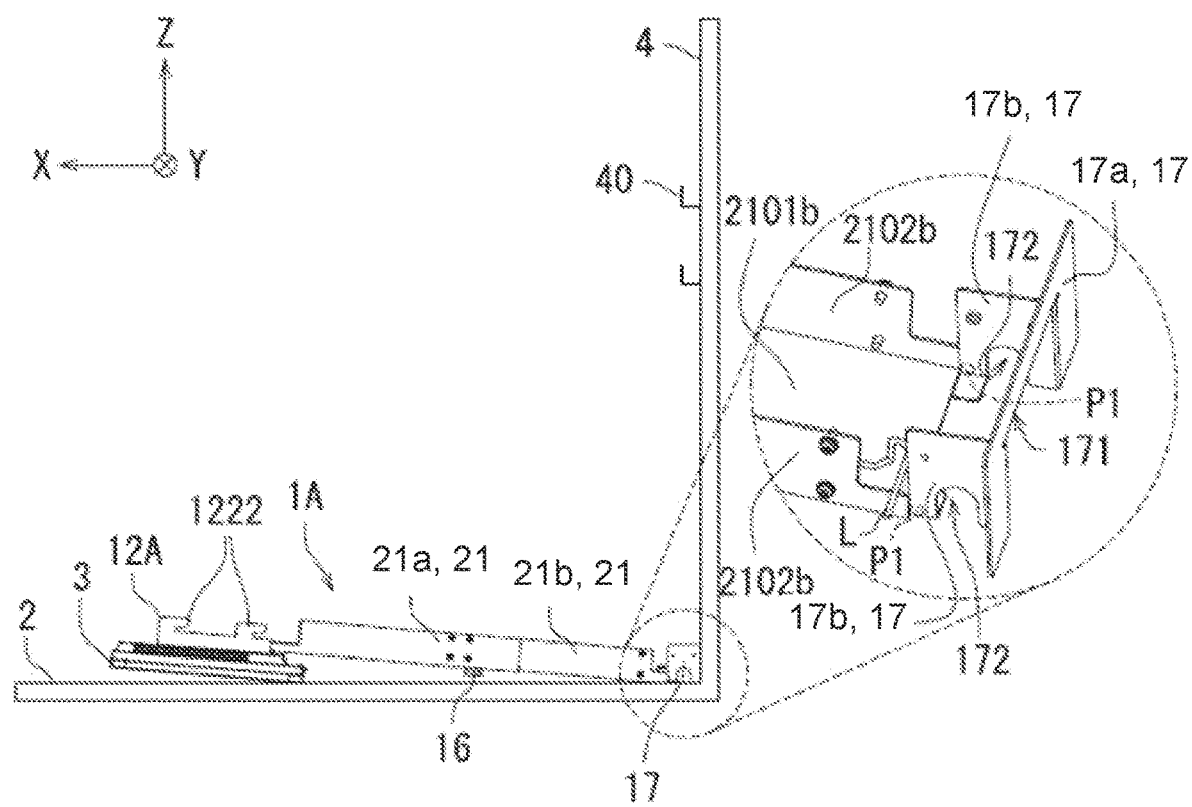
FIG. 13 illustrates the supporting pillar in a second state changed from the state illustrated in FIG. 12.

FIG. 13 illustrates the second state of the supporting pillar 21 changed from the state illustrated in FIG. 12. As illustrated in FIG. 13, by farther rotating the supporting pillar 21 from the state illustrated in FIG. 12, a portion of the plane 2101b of the lower supporting pillar 21b and a portion of the display 3 are brought into contact with the floor surface 2. In this state, the display 3 can be dismounted from the display mounting device 1A by removing the screws (not illustrated) connecting the display fixture 12A and the display 3.

To mount the display 3 on the display mounting device 1A, contrary to the above, the supporting pillar 21 is rotated toward the wall 4 to the first state, Subsequently, the height adjustment screw 16 is loosen to adjust its position so that the height of the hooks 1222 of the display mounting device 1A match the height of the wall-side bracket 40, thus adjusting the height of the entire supporting pillar 21.

After adjusting the height of the entire supporting pillar 21, the supporting pillar 21 is rotated toward the floor surface 2 to the second state, and the rear side of the display 3 placed on the floor surface 2 is connected to the display coupling 121A with screws. This brings the display mounting device 1A to the state illustrated in FIG. 13.

In the state illustrated in FIG. 13, the supporting pillar 21 is rotated toward the wall 4 side using the end point P1 of each supporting pillar fixing portion 17b as the fulcrum. This causes the supporting pillar 21 and the display 3 to move away from the floor surface 2, as illustrated in FIG. 12. Furthermore, using the end point P1 of each supporting pillar fixing portion 17b as the fulcrum, the supporting pillar 21 is rotated toward the wall 4 to bring the display mounting device 1A into the second state (FIG. 8). Since the heights of the hooks 1222 of the display mounting device 1A are adjusted to the height of the wall-side bracket 40, the hooks 1222 can be easily hooked on the wall-side bracket 40 in the second state. In this state, the protrusions 2102b of the lower supporting pillar 21b are fixed to the supporting pillar fixing portions 17b with the screws 21n (FIG. 9B), thus fixing the supporting pillar 21 to the supporting pillar fixing portion 17b.

In the present embodiment, the height of the entire supporting pillar 21 can be adjusted by adjusting the position of the height adjustment screw 16. The height of the entire supporting pillar 21 can be adjusted before the display 3 is mounted on the display mounting device 1A so that the height of the wall-side bracket 40 matches the heights of the hooks 1222 of the display fixture 12A. Adjusting the length of the supporting pillar 21 in advance facilitates hooking the hooks 1222 on the wall-side bracket 40 when the supporting pillar 21 is made to stand perpendicularly from the floor surface 2 after the display 3 is mounted on the display mounting device 1A.

In the present embodiment, the cable L is routed through the recess 110 of the supporting pillar 21, allowing the cable L to pass through the notch 211 of the lower supporting pillar 21b and the notch 172 of the supporting pillar support 17 and be pulled out to the outside of the supporting pillar 21. In this way, the wiring can be routed without compromising the aesthetics of the space where the display 3 is located.

The supporting pillar 21 can be rotated using the end point P1 of the supporting pillar fixing portions 17b as the fulcrum. This facilitates mounting the display 3, when it is relatively lightweight, by one person.

The embodiments of the display mounting device according to the present disclosure have been described. The display mounting device is not limited to those described in the above embodiments, and can be implemented in various forms without departing from the scope and spirit thereof. The drawings mainly illustrate the constituent components schematically for easier understanding, and those illustrated in the drawings are different from actual ones in terms of thickness, length, number, and the like. The shapes, dimensions, and the like of individual constituent components illustrated in the above embodiment are merely examples and are not particularly limited, and various changes can be made without generally departing from the effect, of the present disclosure.

Modification (1) The supporting pillar support 17 in the second embodiment may be replaced by the supporting pillar support 14 in the first embodiment. This allows for safer rotating movement of the supporting pillar 21. The supporting pillar 11 and supporting pillar support 14 in the first embodiment may be replaced by the supporting pillar 21 and supporting pillar support 17 in the second embodiment. This allows for the height adjustment of the entire supporting pillar and also allows the cable L of the display 3 to be pulled out from the inside to the outside of the supporting pillar.

(2) In the first and second embodiments, the supporting pillar supports 14, 17 are fixed to the lower supporting pillars 11b, 21b with the screws 11n, 21n, respectively. Alternatively, the supporting pillar supports 14, 17 may be fixed to the lower supporting pillars 11b, 21b, respectively, using, for example, an elastic member.

Figure 14:
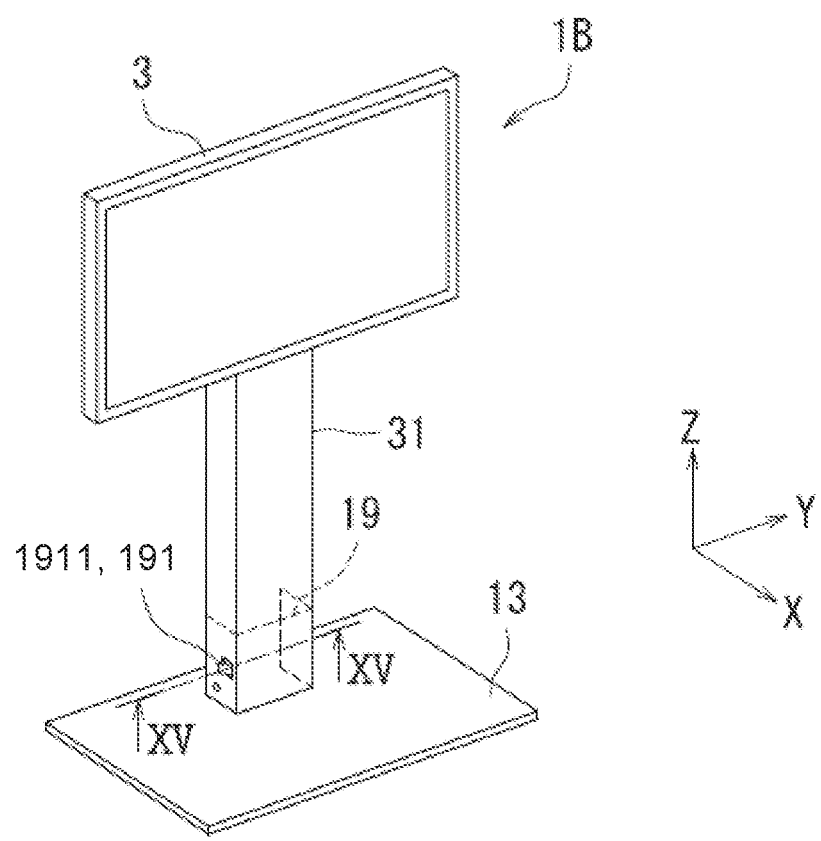
FIG. 14 is a schematic diagram according to a first modification in which the supporting pillar of the display mounting device is in the first state.
Figure 15:
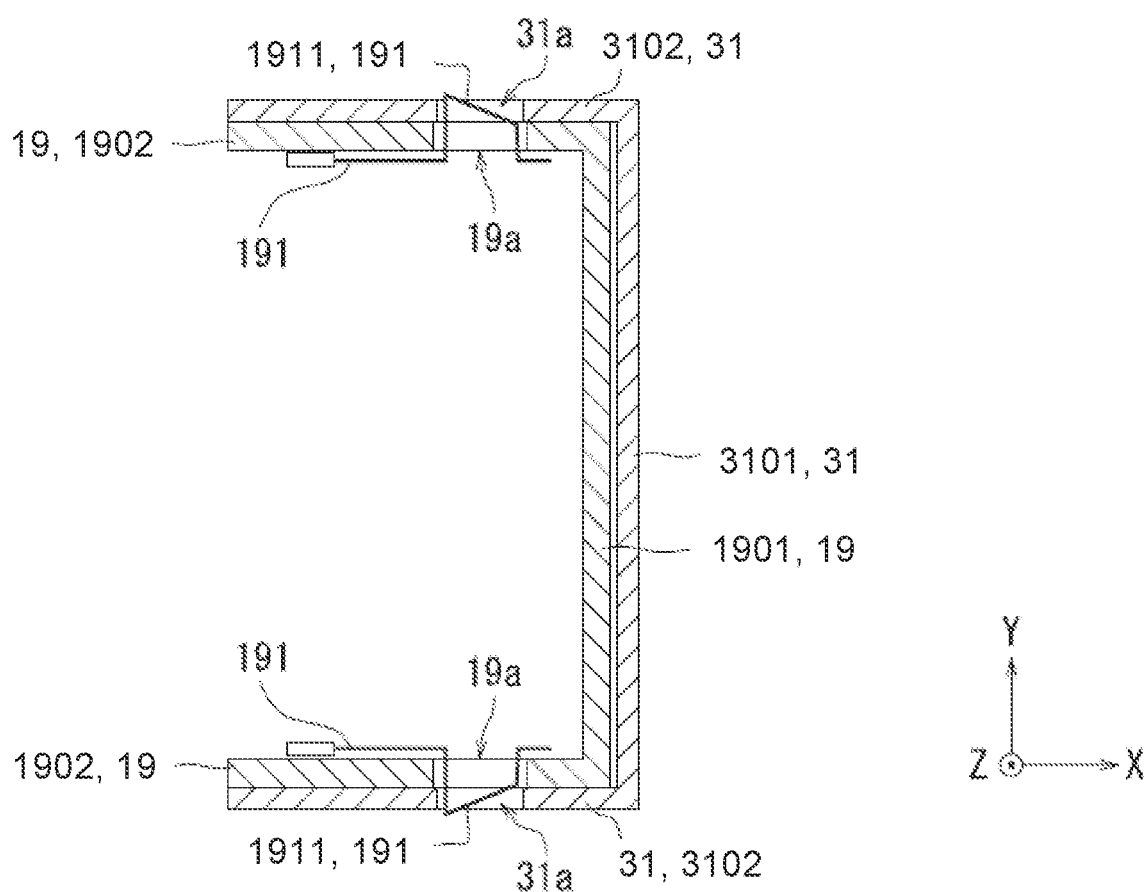
FIG. 15 is a schematic cross-sectional view of the display mounting device cut along line XV-XV illustrated in FIG. 14.

FIG. 14 is a schematic diagram illustrating the first state of a display mounting device 1B according to a first modification. FIG. 15 is a schematic cross-section view cut along line XV-XV of the display mounting device 1B illustrated in FIG. 14.

As illustrated in FIG. 15, the display mounting device 1B includes a supporting pillar 31 and a supporting pillar support 19. Like the supporting pillars 11 and 21, the supporting pillar 31 is formed by connecting upper and lower supporting pillars, although not illustrated, and includes a plane 3101 and a pair of protrusions 3102. The pair of protrusions 3102 each has an opening 31a.

The supporting pillar support 19 includes a plane 1901, a pair of protrusions 1902, and a pair of fixing members 191. The plane 1901 overlaps with the plane 3101 of the supporting pillar 31. The pair of protrusions 1902 overlaps with the pair of protrusions 3102 of the supporting pillar 31. The pair of protrusions 1902 each has an opening 19a at a position overlapping with the opening 31a formed in each protrusion 3102 of the supporting pillar 31.

The fixing member 191 is provided as, for example, a plate spring having a protrusion 1911. The fixing member 191 is adhered to the inner side of the protrusion 1902 of the supporting pillar support 19 at a position overlapping with the opening 19a.

The protrusions 1911 of the fixing members 191 each protrude into the opening 19a of the supporting pillar support 19 and then to the opening 31a of the supporting pillar 31, and hook on the protrusion 3102 of the supporting pillar 31. By hooking the protrusions 1911 of the fixing members 191 on the protrusions 3102 of the supporting pillar 31, the supporting pillar 31 is fixed (locked) to the supporting pillar support 19.

Figure 16:
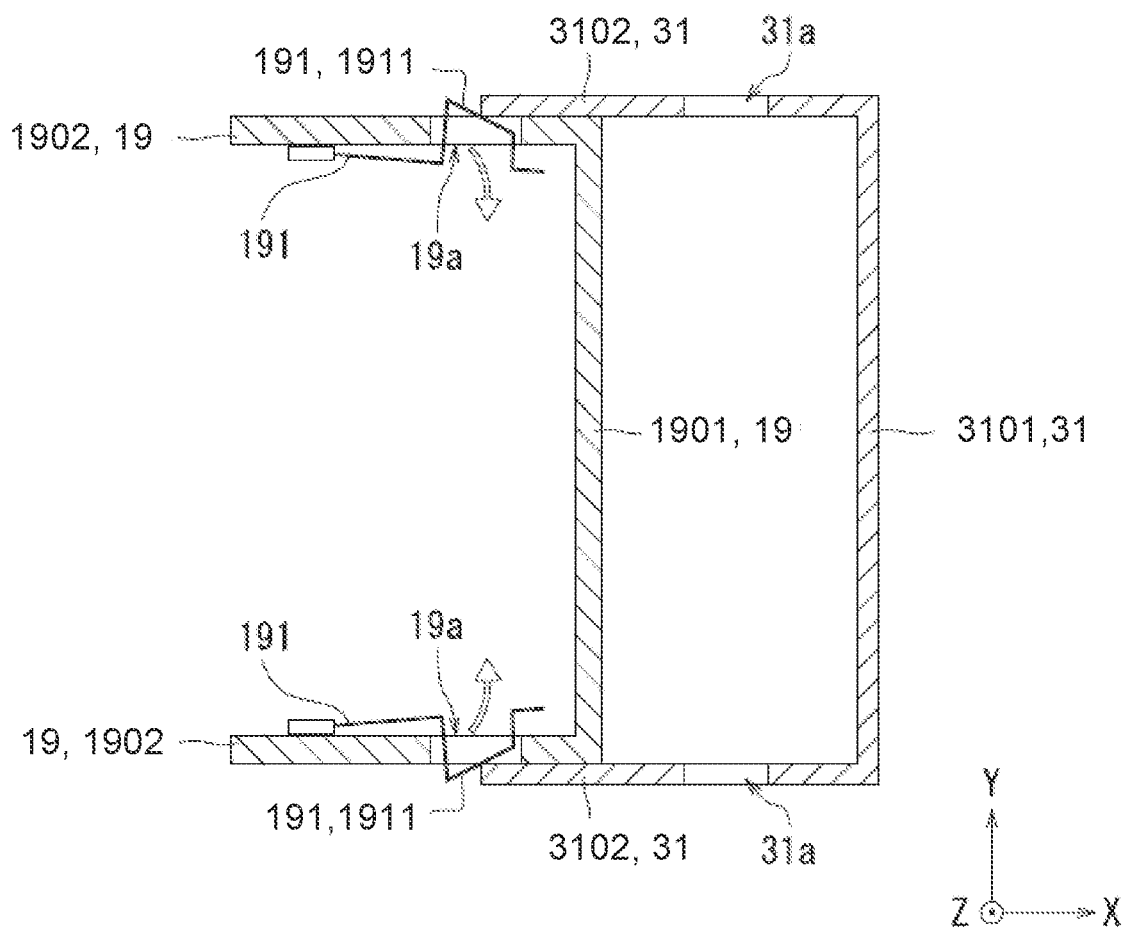
FIG. 16 is a schematic diagram illustrating the supporting pillar and the supporting pillar support when a locked state of the supporting pillar illustrated in FIG. 15 is released.

When the supporting pillar 31 is rotated toward the base 13 side from the locked state illustrated in FIGS. 14 and 15, the locked state of the supporting pillar 31 is released. FIG. 16 is a schematic diagram of the supporting pillar 31 and the supporting pillar support 19 when the locked state of the supporting pillar 31 illustrated in FIG. 15 is released.

When the supporting pillar 31 is rotated toward the base 13 from the state illustrated in FIG. 14, the position of the supporting pillar 31 moves in the X-axis direction, and the positions of the openings 31a of the supporting pillar 31 shift in the X-axis direction. Accordingly, the fixing members 191 are flexed when the fixing members 191 contact the protrusions 3102 of the supporting pillar 31, and the protrusions 1911 are pushed into the openings 19a of the supporting pillar support 19. As a result, the locked state of the supporting pillar 31 is released.

The fixing members 191 are not limited to the plate spring having the integrated protrusions 1911, but may be made of an elastic member different from the plate spring.

The invention claimed is:

1. A display mounting device, comprising:
a supporting pillar on which a display is mounted; and
a supporting pillar fixture installed on a floor surface and coupled with the supporting pillar,
wherein:
in an extending direction of the supporting pillar, the display is detachably attached to a first end of the supporting pillar, and the supporting pillar fixture is coupled with a second end of the supporting pillar opposite the first end in a rotatable manner,
the supporting pillar fixture includes a rotation support that supports the supporting pillar in a rotatable manner, and
the rotation support allows for a rotation of the supporting pillar within a range of angles between a second state in which the extending direction of the supporting pillar is parallel to the floor surface and a first state in which the extending direction of the supporting pillar is perpendicular to the floor surface,
the display mounting device further comprises:
a rotation aid that aids the rotation of the supporting pillar, the rotation aid including an elastic member; and
a lock mechanism that locks the supporting pillar when the supporting pillar is in the first state,
the lock mechanism includes:
a notch being a recess, formed in a part of the first end of the supporting pillar, extending to the second end of the supporting pillar,
a guide being a portion at which a part of the first end of the supporting pillar is slanted toward the notch,
a shaft biased in a direction toward the supporting pillar fixture by the elastic member, the shaft displaceable relative to the supporting pillar fixture in association with the rotation of the supporting pillar, and the shaft displaceable relative to the supporting pillar by moving along the guide in association with the rotation of the supporting pillar, and
a slide mechanism that allows a position of the shaft to slide perpendicularly to the floor surface in association with the rotation of the supporting pillar against a biasing force of the elastic member, wherein
the supporting pillar is locked by the sliding of the shaft vertical to the floor surface along the notch when the supporting pillar is in the first state.

2. The display mounting device according to claim 1, wherein the supporting pillar includes:
a first supporting pillar,
a second supporting pillar connected to the first supporting pillar, and
an adjusting mechanism that adjusts a length of a connected portion between the first supporting pillar and the second supporting pillar to adjust a length of an entirety of the supporting pillar in the extending direction.

3. The display mounting device according to claim 1, wherein
the supporting pillar includes an inner wiring compartment that accommodates a wiring connected to the display along the extending direction of the supporting pillar, and the supporting pillar fixture has an opening that communicates with the inner wiring compartment.

* * * * *